US009227141B2

(12) United States Patent
Mays, III et al.

(10) Patent No.: US 9,227,141 B2
(45) Date of Patent: Jan. 5, 2016

(54) TOUCH SCREEN GAME CONTROLLER

(71) Applicant: MICROSOFT CORPORATION, Redmond, WA (US)

(72) Inventors: Eddie Louis Mays, III, Renton, WA (US); John Raymond Justice, Bellevue, WA (US); Krassimir Emilov Karamfilov, Bellevue, WA (US); Roderick Michael Toll, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/145,922

(22) Filed: Dec. 31, 2013

(65) Prior Publication Data
US 2015/0182856 A1 Jul. 2, 2015

(51) Int. Cl.
A63F 13/21 (2014.01)
A63F 13/2145 (2014.01)

(52) U.S. Cl.
CPC .................................. A63F 13/2145 (2014.09)

(58) Field of Classification Search
CPC .................................................... A63F 13/2145
USPC ............................................................ 463/37
See application file for complete search history.

(56) References Cited

U.S. PATENT DOCUMENTS 6,057,845 A * 5/2000 Dupouy .............. G06F 3/04883 382/186
8,678,927 B2 * 3/2014 Hammontree .......... A63F 13/06 463/20
D705,799 S * 5/2014 Funabashi .................... D14/487
8,782,567 B2 * 7/2014 Latta ....................... G06F 3/017 345/156
2005/0024341 A1* 2/2005 Gillespie ............... G06F 1/1616 345/173
2011/0285636 A1* 11/2011 Howard .............. G06F 3/04883 345/173
2011/0300934 A1* 12/2011 Toy .......................... A63F 13/10 463/31
2011/0314093 A1* 12/2011 Sheu ..................... G06F 9/4445 709/203
2012/0242590 A1* 9/2012 Baccichet ............... A63F 13/02 345/173
2013/0290909 A1* 10/2013 Gray ...................... G01C 21/00 715/854
2014/0098038 A1* 4/2014 Paek ..................... G06F 1/1692 345/173
2014/0253775 A1* 9/2014 Kim .................. H04N 5/23216 348/333.01
2014/0282061 A1* 9/2014 Wheatley ............. G06F 3/0481 715/745

* cited by examiner

Primary Examiner — Corbett B Coburn
(74) Attorney, Agent, or Firm — Jim Banowsky; Kate Drakos; Micky Minhas

(57) ABSTRACT

Aspects of the present invention allow a touch screen device to operate as a gamepad for a video game running on a separate gaming device. Aspects of the present invention provide a virtual control interface through the touch screen that includes virtual game controls that perform the same function as a directional pad, buttons, triggers, and sticks found on a gamepad or other game controller. In one aspect, the virtual control interface provides an output that is substantially similar to an output generated by a gamepad able to interact with the gaming device. Substantially similar outputs allow a gaming device to respond to a functional control from a gamepad and an equivalent functional control from the virtual control interface the same way and without translation. Aspects of the present invention can provide different virtual control interfaces for different video game titles, different genres, and based on user customization.

21 Claims, 15 Drawing Sheets

TOUCH SCREEN GAME CONTROLLER

BACKGROUND

Video games are often controlled using a sophisticated game controller that includes multiple joy sticks and 10-20 separate buttons. The game controllers may vibrate and emit sounds in response to signals received from the game console. Some game controllers include a built-in display that provides supplemental game content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the present invention allow a touch screen device to operate as a gamepad for a video game played on that same device (e.g. a phone or a tablet) or on a separate gaming device (e.g., a game console, a PC). Aspects of the present invention provide a virtual control interface that includes virtual game controls that perform the same function as a directional pad, buttons, triggers, and sticks found on a gamepad. The virtual game controls can be ergonomically located on the touch screen to accommodate different hand sizes and methods of holding a touch screen device. The control's location may be dynamically adjusted accommodate individual users hand size, preferred hand location, preferred interaction style, and grip style. Location can be adjusted based on how the user is holding the touch screen device.

In one aspect, the virtual control interface provides an output that is substantially similar to an output generated by a gamepad able to interact with the gaming device. Substantially similar outputs allow a game and a gaming device to respond to a functional control from a gamepad and an equivalent functional control from the virtual control interface in the same way and without translation. For example, pushing the green reference button on the gamepad and pushing the corresponding virtual green reference button on the virtual control interface will result in the gaming device and the game receiving the same functional signal. The signal generated by the touch screen device and gamepad may differ in some ways, for example, different devices may generate different identification information.

Aspects of the present invention can provide different virtual control interfaces for different video game titles. In one aspect, the user can select a virtual control interface from a group of appropriate virtual control interfaces. Virtual control interfaces may be optimized for different characteristics of a game. For example, virtual control interfaces may be optimized for a game genre. In one aspect, the virtual control interface may be selected for a particular game title. In one aspect, the virtual control interface is user customizable. The user may move virtual game controls around on the interface and resize them as desired. The customized virtual game control interface may be shared with friends and/or saved for later retrieval. The user can create customized virtual shortcuts that represent a combination of interactions with a gamepad. For example, a single virtual game control could cause an action in the game that requires multiple gamepad controls to be pressed.

To replicate a gamepad's tactile button feedback, a visual indication or audible indication may be provided to let the user know that he successfully interacted with a virtual game control. For example, the perimeter of a touch screen may glow faintly blue in response to selection of a blue button. Arrows or other visual indicia can provide feedback indicating selection of a virtual direction pad or virtual stick.

BRIEF DESCRIPTION OF THE DRAWINGS

Aspects of the invention are described in detail below with reference to the attached drawing figures, wherein.

DETAILED DESCRIPTION

Figure 1:
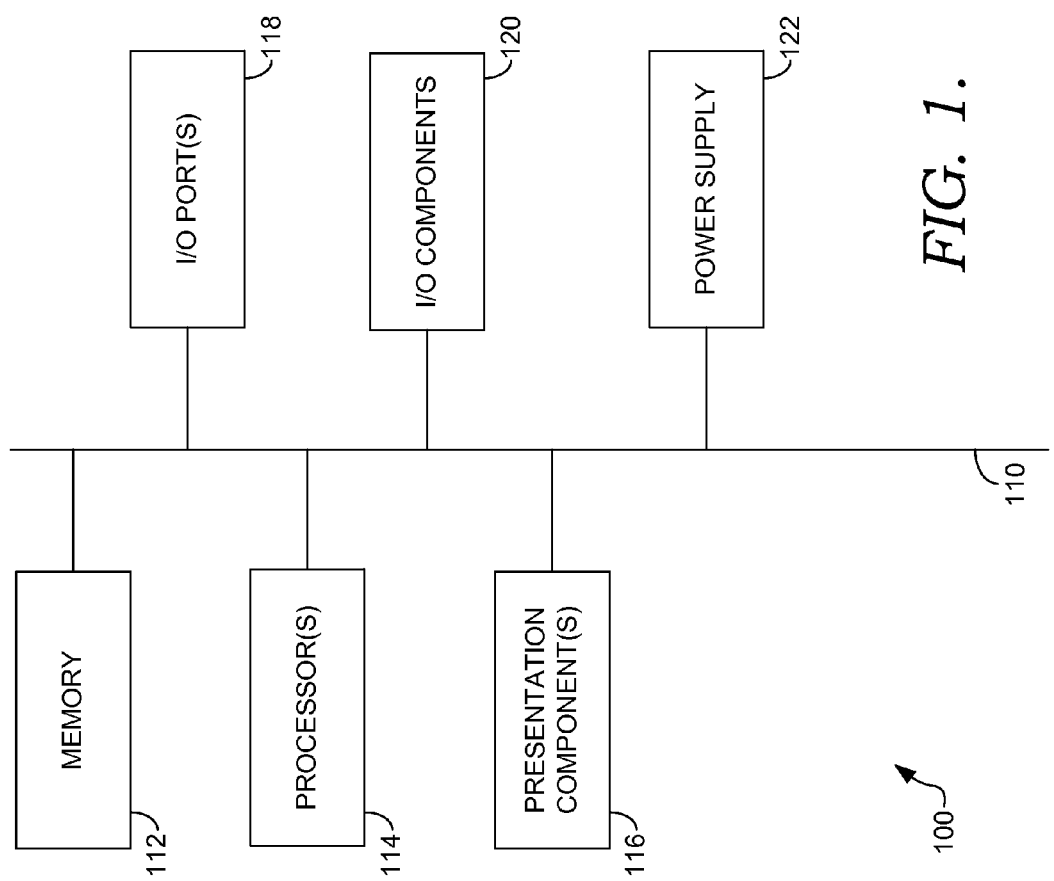
FIG. 1 is a block diagram of an exemplary computing environment suitable for implementing aspects of the invention.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention allow a touch screen device to operate as a gamepad for a video game played on that same device (e.g., a phone or a tablet) or on a separate gaming device (e.g., a game console, a PC). Exemplary gaming devices include game consoles and personal computers. Exemplary gamepads include the Xbox 360 controller, Xbox One controller, Wii Remote, Wii U™ GamePad and Sony's DualShock®3. Generally, a gamepad will include multiple input controls, including a directional pad, buttons, triggers, and one or more sticks. A game pad can include between 10 and 20 inputs.

Aspects of the present invention provide a virtual control interface that includes virtual game controls that perform the same function as a directional pad, buttons, triggers, and sticks found on a gamepad. The virtual game controls can be ergonomically located on the touch screen to accommodate different hand sizes and methods of holding a touch screen device. The control's location may be dynamically adjusted accommodate individual users hand size, preferred hand location, preferred interaction style, and grip style. Location can be adjusted based on how the user is holding the touch screen device.

In one aspect, the virtual control interface provides an output that is substantially similar to an output generated by a gamepad able to interact with the gaming device. Substantially similar outputs allow a gaming device to respond to a functional control from a gamepad and an equivalent functional control from the virtual control interface in the same way and without translation. For example, pushing the green reference button on the gamepad and pushing the corresponding virtual green reference button on the virtual control interface will result in the gaming device and the game receiving the same functional signal.

The signal generated by the virtual control interface and that of a real gamepad may differ in some ways, for example, different devices may generate different identification information. In another aspect, the touch screen device can communicate commands through a different communication channel, such as WI-FI, from the one used by the gamepad, such as infrared. When different channels are used, the functional instruction generated by the touch screen device may still be similar to the functional instruction generated by a gamepad.

Aspects of the present invention can provide different virtual control interfaces for different video game titles. In one aspect, the user can select a virtual control interface from a group of appropriate virtual control interfaces adapted for a particular touch screen device. The virtual control interfaces may be purchased and downloaded to a touch screen device for use. Players may be given an opportunity to rate available virtual control interfaces. The ratings may be shared with friends for display in conjunction with a description of a virtual control interface at a point where the virtual control interface is purchased and/or downloaded.

Virtual control interfaces may be optimized for different characteristics of a game. For example, virtual control interfaces may be optimized for a game genre. A first virtual control interface may be optimized for racing games, a second virtual control interface may be optimized for shooting games, and a third virtual control interface may be optimized for fighting games. Other virtual control interfaces may be more general. In one aspect, a general control interface is optimized during play by analyzing which virtual controls the user is interacting with. The virtual controls may be resized and relocated to make the most commonly used virtual controls more conveniently located and sized.

In one aspect, the virtual control interface may be selected for a particular game title. Controls found on a game that are not used by the game title may be left off or were omitted from the virtual control interface. Similarly, the most frequently used controls within the game title may be conveniently located and sized. In addition to controls found on a gamepad, special controls may be added to a virtual control interface. The special controls may represent a combination of button pushes on a gamepad. In other words, selecting a virtual control may result in a functional instruction that corresponds to a functional instruction that would result from interacting with multiple functions on a gamepad. In addition controls may be given names that are meaningful within that particular title and help the user more easily learn how to play the game. Controls can also be styled in a way that is aligned with the look and feel of the game.

In one aspect, the virtual control interface is user customizable. The user may move virtual game controls around on the interface and resize them as desired. The customized virtual game control interface may be shared with friends and/or saved for later retrieval. The user can create customized virtual shortcuts that represent a combination of interactions with a gamepad. For example, a single virtual game control could combine movement with automatic weapon firing.

As mentioned, the virtual control interface may also be customized for a user in an automated fashion by analyzing the user's interactions with the virtual interface. Virtual controls may be resized and relocated to accommodate the user. In addition, various virtual controls are removed and resized during game play based on user interaction. For example, a game control can be located in response to the user's first touch on the screen. Each time users removes their hand from the touch screen, the virtual control is relocated upon the next touch. This arrangement may be suitable for virtual controls that replace a stick or direction pad.

To replicate a gamepad's tactile button feedback, a visual indication or audible indication may be provided to let the user know that he successfully interacted with a virtual game control. For example, the perimeter of a touch screen may glow faintly blue in response to selection of a blue button. Arrows or other visual indicia can provide feedback indicating selection of a virtual direction pad or virtual stick.

Aspects of the present invention may translate gamepad feedback instructions from the gaming device into an output that is adapted for the touch screen device. For example, a feedback instruction to "rumble" may be translated into a screen flash or other visual output or audio output. Alternatively, the touch screen device may vibrate if a vibration function is included within the touch screen device. Audio feedback may be output through the touch screen device's speakers.

In one aspect, developers can provide customized virtual game controls for their games. Developers may improve the effectiveness of a controller design by providing configuration settings for the controller and/or providing run-time hints. For example, a developer can configure button placement, size, types of buttons, what buttons are needed, combos, and the like. At run-time, a soccer game could give the system an annotation indicating whether the player is on offense vs. defense, which could change the function and look (e.g., names) of the buttons. Developers can also provide art that is complimentary to the look and feel of the game.

Having briefly described an overview of aspects of the invention, an exemplary operating environment suitable for use in implementing aspects of the invention is described below.

Exemplary Operating Environment

Referring to the drawings in general, and initially to FIG. 1 in particular, an exemplary operating environment for implementing aspects of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more aspects of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
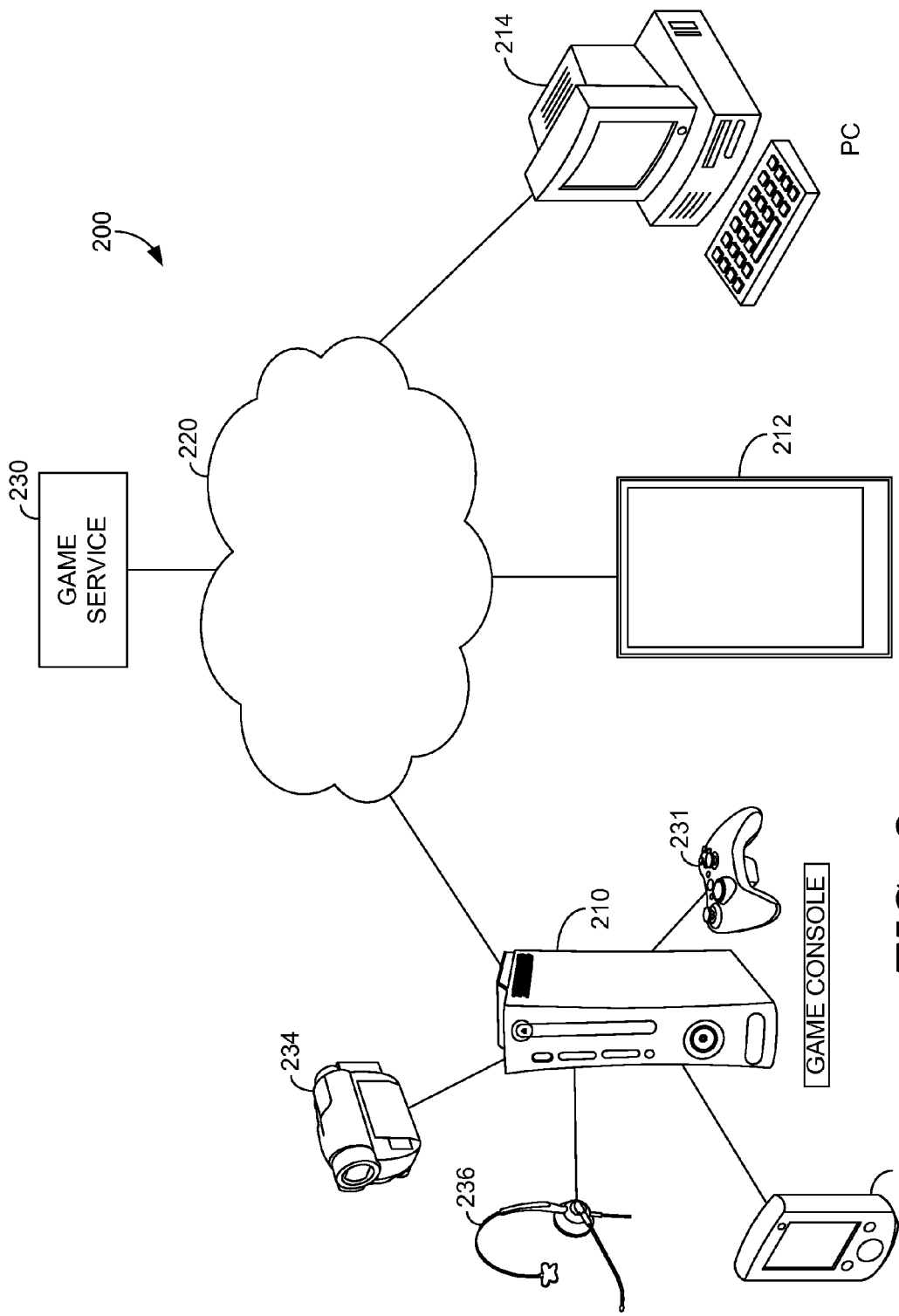
FIG. 2 is a diagram of a gaming environment, in accordance with an aspect of the present invention.

Turning now to FIG. 2, an online gaming environment 200 is shown, in accordance with an aspect of the present invention. The online gaming environment 200 comprises various game clients connected through a network 220 to a game service 230. Exemplary game clients include a game console 210, a touch screen device 212, and a personal computer 214. Use of other game clients, such as smart phones, are also possible. The game console 210 may have one or more game controllers communicatively coupled to it. In one aspect, the touch screen device 212 may act as an input device for a game console 210 or a personal computer 214 using a virtual control interface. Network 220 may be a wide area network, such as the Internet.

The controllers associated with game console 210 include game pad 231, tablet 232, headset 236, and depth camera 234. A game console may be associated with control devices that generate both a rich input and a basic input. Individual controllers are capable of generating different kinds of inputs and a single controller could generate both a rich input and an basic input.

The game pad 231 may be capable of generating basic control signals, such as those generated by button selections and joystick movement. Movement data such as that generated by accelerometers and gyros within the game pad 231 may be examples of rich sensory data. In some implementations, the movement data is not considered a rich sensory data.

Tablet 232 is shown coupled directly to the game console 210, but the connection could be indirect through the Internet or a subnet. In one aspect, the game service 230 helps make a connection between the tablet 232 and touch screen device 212 and the game console. The tablet 232 is capable of generating numerous input streams and may also serve as a display output mechanism. In addition to being a primary display, the tablet 232 could provide supplemental game information related to information shown on a primary display coupled to the game console 210, or simply be a control surface. The input streams generated by the tablet 232 include video and picture data, audio data, movement data, touch screen data, and keyboard input data.

The headset 236, captures audio input from a player and the player's surroundings and may also act as an output device if it is coupled with a headphone or other speaker.

The depth camera 234 generates a depth cloud used as a control input. The depth camera 234 may an use infrared camera to determine a depth, or distance from the camera for each pixel captured. Stereoscopic depth cameras are also possible. In addition, the depth camera 234 may capture a typical color stream or picture. The depth camera 234 may have several image gathering components. For example, the depth camera 234 may have multiple cameras.

Various combinations of components shown in FIG. 2 can generate a virtual control interface and/or execute code needed to play a video game. For example, game code could be executed by game console 210 and controlled by a virtual control interface generated by tablet 212 or tablet 232. In one aspect, game code could be executed by PC 214 and controlled by a virtual control interface generated by tablet 212 or tablet 232. In another aspect, game code to be executed by game service 230 producing a rendered video game image that is displayed on PC 214, a television (not shown), on tablet 212 or tablet 232. The video game image can be simultaneously displayed on tablet 212 or tablet 232 along with a virtual control interface. In another aspect, tablet 212 or tablet 230 to execute the game code and generates a virtual control interface that controls the game. In one aspect, the game code and virtual control interface is generated by tablet 212 and a video game image is communicated to a separate device, such as PC 214 or a television (not shown). In another alternative, the video game code is executed on tablet 212 and displayed through tablet 212 along with a virtual control interface. Other combinations can be possible including split render and execution scenarios where part of the video game code is executed by different devices and combined into a single video game image.

Game service 230 may comprise multiple computing devices communicatively coupled to each other. In one aspect, the game service 230 is implemented using one or more data centers. The data centers may be spread out across various geographic regions including cities throughout the world. In this scenario, the game clients may connect to the closest data centers. Aspects of the present invention are not limited to this setup.

The game service 230 allows the game to be executed within the computing devices provided by the game service 230. A communication session between the game service and game clients carries input traffic to the game service 230 and can return a rendered game image and/or other game output.

The virtual control interface may run on the touch screen device 212 to present and interface and communicate output to the gaming device (e.g. game console 210, PC 214). An application can also run on the game console 210 or PC 214 to receive the output from the touch screen device and translate into commands understood by a game title.

Exemplary Gaming Device and Game Service for Virtual Interface Control

Figure 3:
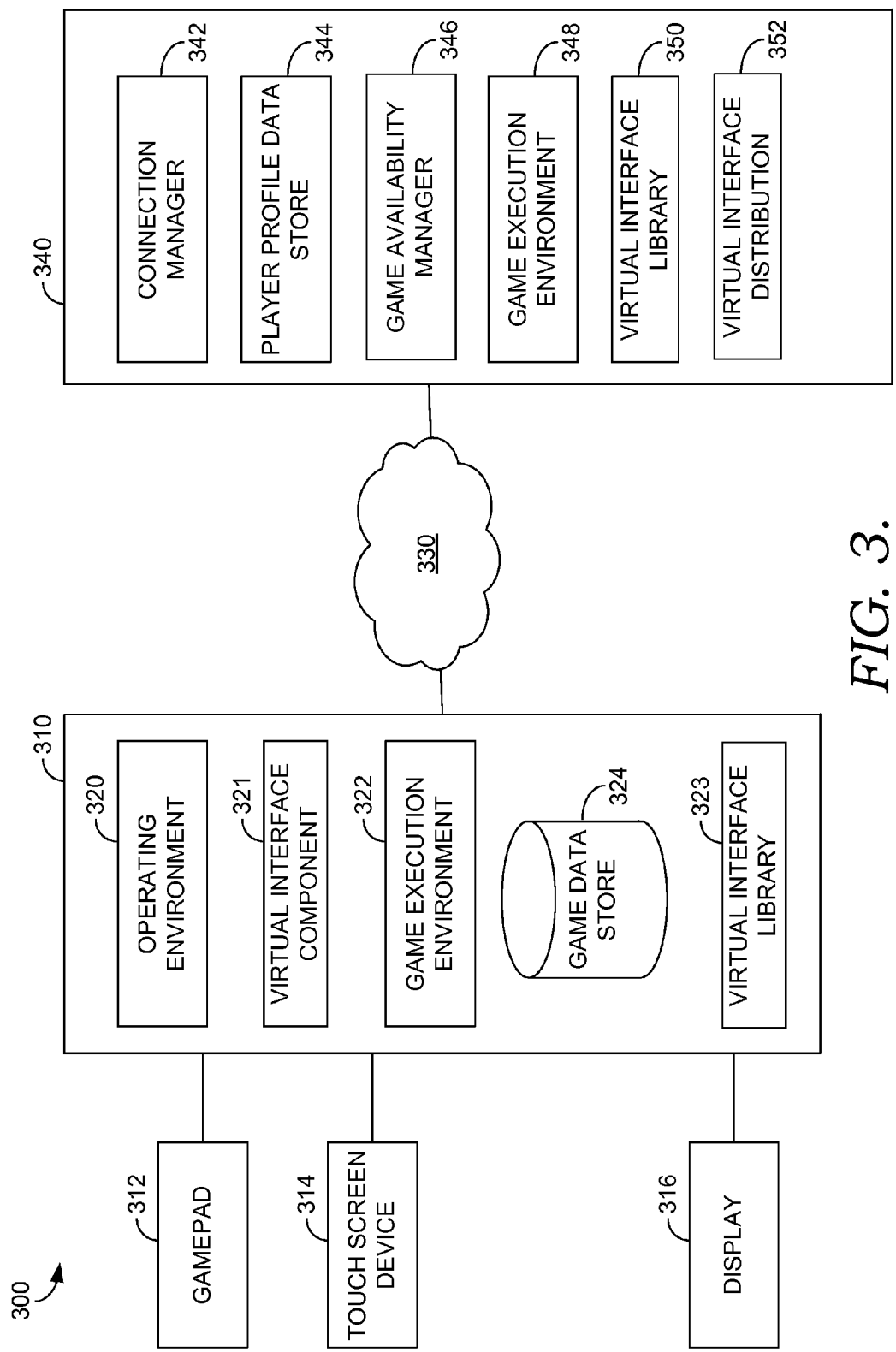
FIG. 3 is a diagram of a remote computing environment for gaming, in accordance with an aspect of the present invention.

Turning now to FIG. 3, an exemplary remote gaming environment 300 is shown, in accordance with an aspect of the present invention. The remote gaming environment 300 includes a gaming device 310 communicatively coupled to a game server 340 through a network 330. In one aspect, the network may be the Internet. The gaming device 310 is connected to a gamepad 312, a touch screen device 314, and a display 316. Other game input devices may be used with the gaming device 310, including keyboards, a mouse, a touch pad, a touch screen, a microphone for receiving voice commands, a depth camera, a video camera, and a trackball. Aspects of the present invention are not limited to these input devices. The display 316 is capable of displaying video game content. For example, the display 316 may be a television or computer screen.

The touch screen device 314 runs a virtual control interface program. The virtual control interface program allows the touch screen device 314 to output a suitable virtual control interface. The virtual control interface program may translate inputs received through the touch screen into functional commands understood by a gaming device, and/or by a virtual interface component 321 on the gaming device. The virtual control interface may control a game running on the touch screen device 314, the gaming device 310, or the game service 340. Controls can be translated into an appropriate format as needed for consumption by the device running the game. The functions of the virtual control interface program are described in detail with reference to FIGS. 16, 17, and 18. Exemplary virtual control interfaces and virtual controls will be illustrated subsequently with reference to FIGS. 5-15.

The gaming device 310 is a computing device that is able to execute video games. The gaming device 310 could be laptop computer or a game console. The gaming device 310 includes an operating environment 320, a virtual interface component 321, a game execution environment 322, a virtual interface library, and a game data store 324. Other components of the gaming device 310 are not shown for the sake of simplicity.

The operating environment 320 may be provided by an operating system that manages the hardware and provides services to applications running on the gaming device 310. The operating environment may allocate client resources to different applications as part of game and communication functions.

The game data store 324 stores downloaded games, game samples, and/or partially downloaded games. Games may be downloaded in playable blocks. To play a game, the game may need to be loaded from the game data store 324 into active memory associated with the game execution environment 322. The game data store 324 may also store player progress files.

The game execution environment 322 comprises the gaming resources on the device 310 required to execute instances of a game. The game execution environment 322 comprises active memory along with computing and video processing resources. The game execution environment 322 receives gaming controls and causes the game to be manipulated and progressed according to game programming. In one aspect, the game execution environment 322 outputs a rendered video stream that is communicated to the display 316.

The virtual interface component 321 can enable a video game title running within game execution environment 322 or game execution environment 348 to be controlled by a virtual control interface running on touch screen device 314. The virtual interface component 321 may facilitate communications between the touch screen device and the gaming device 310. Communications between the gaming device 310 touch screen device 314 can be bidirectional. The virtual interface component 321 may translate functional instructions received from the touch screen device into commands that can be fed into an understood by the game execution environment 322 to manipulate the video game. Likewise, the virtual interface component 321 may receive feedback from the game execution environment 322 and translated into a feedback instruction that is consumable by the touch screen device. For example, a rumble command could be translated into a command to activate the vibration function on the touch screen device.

The virtual interface component 321 can also facilitate customization of a virtual control interface and storage of the customized virtual control interface within virtual interface library 323 or virtual interface library 350. The virtual interface component 321 may also facilitate the storage of user preferences.

The game server 340 comprises a connection manager 342, a player profile data store 344, a game availability manager 346, a game execution environment 348, a virtual interface library 350, and a virtual interface distribution component 352. Though depicted as a single box, the game server 340 could be a data center that comprises numerous machines, or even several data centers. Several of the servers could act as clients for a central server that coordinates the game experience.

The connection manager 342 builds a connection between the gaming device 310 and the service 340. The connection manager 342 may also provide various authentication mechanisms to make sure that the user is authorized to access the game service provided by the service 340. The connection manager may provide security, encryption, and authentication information to servers and virtual machines as they are added to a game session.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. A player's score, achievements, and progress through game levels may be stored. Further, the player profile data store 344 may store information about individual player preferences such as language preferences. The player may access the game level information from multiple clients. For example, the player's progress could be accessed from a friend's game console or on the player's mobile device.

The player profile data store 344 may also store a usage history for the individual player. A player's history of purchasing games, virtual control interfaces, sampling games, or playing games through a game service that does not require the purchase of the games may be stored. A record of a player's favorite virtual control interfaces for various games may be tracked.

The game availability manager 346 analyzes the usage data to determine, among other things, how many standby instances of a particular game title should be available. In general, games with a high demand will have more standby instances of a game available. Loading a game into active memory to create a standby instance may take a minute or two; thus, games with high churn in and out may also require more standby instances of games to be available. The time it takes to create a standby instance of a particular game title also should be considered. Games that load comparatively quickly may require less standby instances because additional game instances can be generated more quickly as demand changes. In other words, games with a slower load time may require more available standby games.

The game execution environment 348 comprises the gaming resources required to execute instances of a game. The game execution environment 348 comprises active memory along with computing and video processing. The game execution environment 348 receives gaming controls, such as reduced controller input, through an I/O channel and causes the game to be manipulated and progressed according to its programming. In one aspect, the game execution environment 348 outputs a rendered video stream that is communicated to the game client. In other aspects, the game execution environment 348 outputs game geometry, or other representations, which may be combined with local objects on the gaming client to render the gaming video.

The virtual interface library 350 stores available virtual control interfaces. Virtual control interfaces may be created by developers and associated with game titles. The virtual control interfaces may be purchased from the virtual interface library through the virtual interface distribution component 352. Virtual control interfaces may also be created by users and stored for subsequent use. User-created virtual control interfaces may also be shared with friends or anyone else depending on the creators distribution preferences. Some virtual control interface may be given away for free or for promotional consideration.

The library 350 can store virtual control interfaces using a classification system and a ranking system. The classification system can be used to classify an interface by game genre, game title, developer, hardware, or other characteristic. The ranking system can be based on user feedback. The feedback could be explicit or implicitly derived from usage. A frequently downloaded interface can be ranked more highly than in frequently downloaded interface.

The virtual interface distribution component 352 manages a cloud-based ecosystem of virtual control interfaces. The distribution component 352 can promote virtual control interfaces to users through recommendations, advertisements, rankings, and user comments or reviews. In one aspect, the distribution component 352 may analyze a user's gaming history and recommend virtual control interfaces that may be of use.

The virtual interface distribution component 352 can also facilitate communication of customized virtual control interfaces between friends. A first user can upload a virtual control interface to the virtual interface library 350 and give permission for friends to access the interface. In one aspect, friends or designated via a social network. In other words, a user could specify that any relation within the user social network can have access to a virtual control interface she created. In one aspect, the user's social network comprises contacts within an online gaming service. In another aspect, the user's social network comprises contacts within one or more dedicated social networks, such as Facebook.

The virtual interface distribution component 352 allows users to search for virtual control interfaces that may be of interest. The virtual control interfaces may be ranked by popularity. The popularity of a virtual control interface may be ascertained by its frequency of download, customer ratings, reputation of its creator, or through some other method. For example, a game developer may be assigned a better reputation than an amateur. The search function can allow users to search for virtual control interfaces tailored to a particular game genre or even a particular game title.

The virtual interface distribution component 352 may provide a platform that is downloadable to touch screen devices and gaming devices. The downloadable platform can be adapted for different operating systems and services. In one aspect, the virtual control interfaces are applications that run within the platform. In this way, different platforms may be created for different operating systems or devices, but a single version of the virtual control interface application could run across multiple platforms, screen sizes, etc. This would allow a single version of the virtual control interface to be operable across different types of devices and operating systems.

Figure 4:
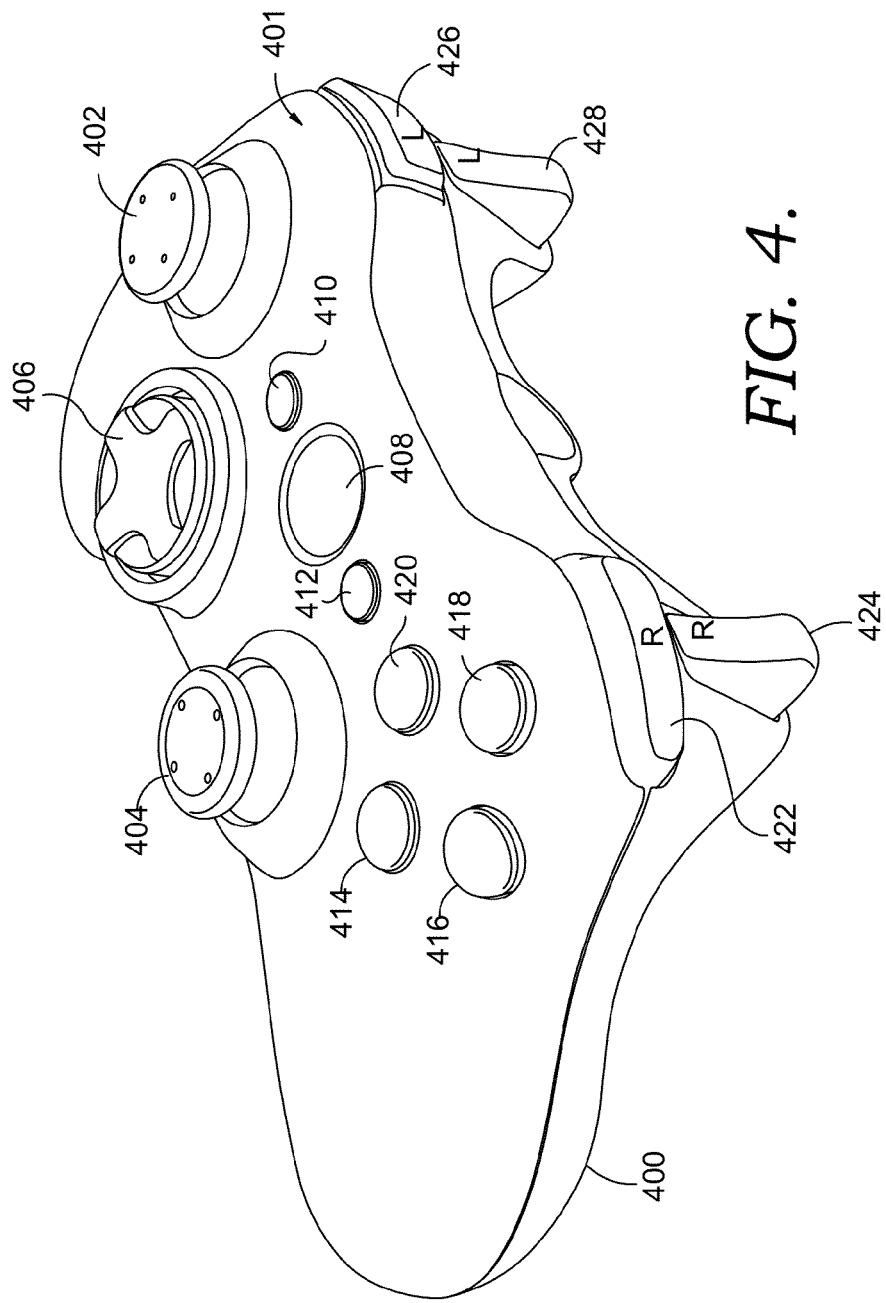
FIG. 4 is a diagram of a standard gamepad.

Turning now to FIG. 4, a gamepad controls on standard gamepad 400 is shown. Any control on a gamepad may be described as a gamepad control herein. The gamepad 400 comprises several gamepad controls, including a left stick 402 and a right stick 404. Gamepad controls on the top side 401 of gamepad 400 includes a direction pad 406, a guide button 408, a back button 410, a start button 412, and face buttons 414, 416, 418, and 420. Other gamepad controls on the gamepad 400 are a right bumper 422 and a right trigger 424. The gamepad 400 also includes a left bumper 426 and a left trigger 428.

The gamepad 400 is ergonomically designed to be held by both the user's right and left hand. The left hand may control the left stick 402 along with the left bumper 426 and the left trigger 428. A user may prefer to control the left stick 402 with his left thumb, the left bumper 426 with his left index finger, and the left trigger 428 with his left middle finger. The right hand may control the right stick 404 along with the right bumper 422 and the right trigger 424. A user may prefer to control the right stick 404 with his right thumb, the right bumper 422 with his right index, and the right trigger 424 with his right middle finger. The face buttons 414, 416, 418, and 420 may also be controlled by the user's right hand.

The different controls on the gamepad 400 control different features of a game. For example, moving the left stick 402 may translate a player through the game while the right stick 404 rotates the view. Game developers can establish each button's function in a game.

As used herein, the phrase "activating a gamepad control" means interacting with a gamepad control to cause a functional instruction to be communicated from the gamepad 400. For example, pushing a reference button is an example of activating a gamepad control. In response to pushing a reference button, the gamepad generates a functional instruction that is communicated to the gaming device. The gaming device interprets the functional instruction as a push of the reference button. This instruction may be fed to a video game title and the game manipulated according to the consequence of pushing the reference button. Moving a stick is another example of activating a gamepad control. Holding a stick or a button in a particular position or state may cause multiple functional instructions to be generated by gamepad.

Figure 5:
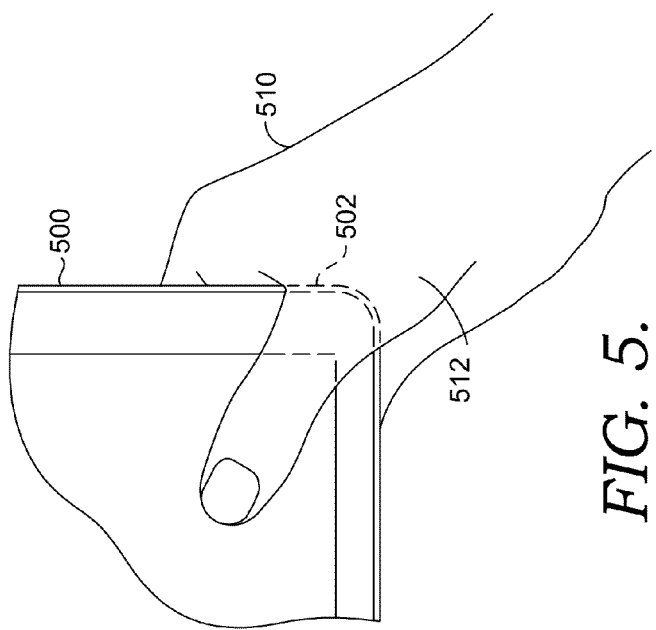
FIG. 5 is a diagram of an exemplary hand position suitable to manipulate a virtual control interface on a touch screen device, in accordance with an aspect of the present invention.

Turning now to FIG. 5, an exemplary hand position suitable to manipulate a virtual control interface on a touch screen device 500 is shown, in accordance with an aspect of the present invention. A user holds the touch screen device 500 with the bottom corner 502 of her right hand 510 fit snugly in the crotch between her thumb 512 and forefinger. This can position allows the user to interact with a virtual game controls located in the lower right-hand side of the touch screen device 500.

Figure 6:
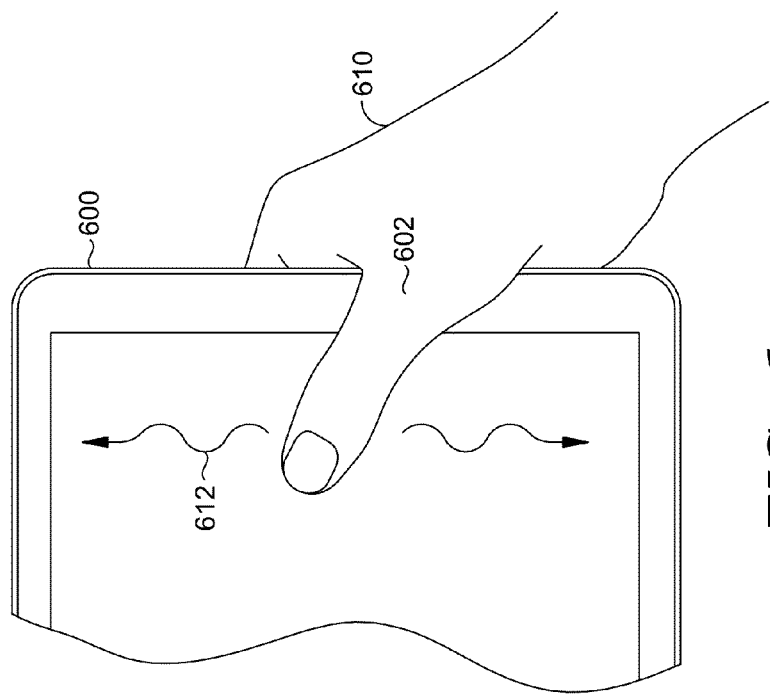
FIG. 6 is a diagram of an exemplary hand position suitable to manipulate a virtual control interface on a touch screen device, in accordance with an aspect of the present invention.

Turning now to FIG. 6, an exemplary hand position suitable for use with a virtual control interface on a touch screen device 600 is shown, in accordance with an aspect of the present invention. The user holds the right side of touch screen device 600 in the crotch formed by his thumb 602 and forefinger of his right hand 610. In this position, the user can slide 612 his thumb 602 up and down the touch screen. Though not shown, the user's fingers could contact a touch service located on the back of touch screen device 600. For example, a keyboard could be folded behind the touch screen device. Individual keys on the keyboard could be mapped to controls on a gamepad. Alternatively, areas of the touch keyboard could be associated with a control such as a bumper or trigger.

Other hand positions are possible. For example, the user could lay a touch screen device on a surface and use multiple fingers to interact with the virtual control interface.

FIGS. 7-15 provide examples of possible virtual control interfaces. As mentioned, a touch screen device could execute game code and display a video game image through the touch screen along with the virtual control interface that controls the game. In another aspect, the video game image generated by and/or displayed by a different device. For the sake of simplicity, the video game image is not shown in the examples of virtual control interfaces provided herein.

Figure 7:
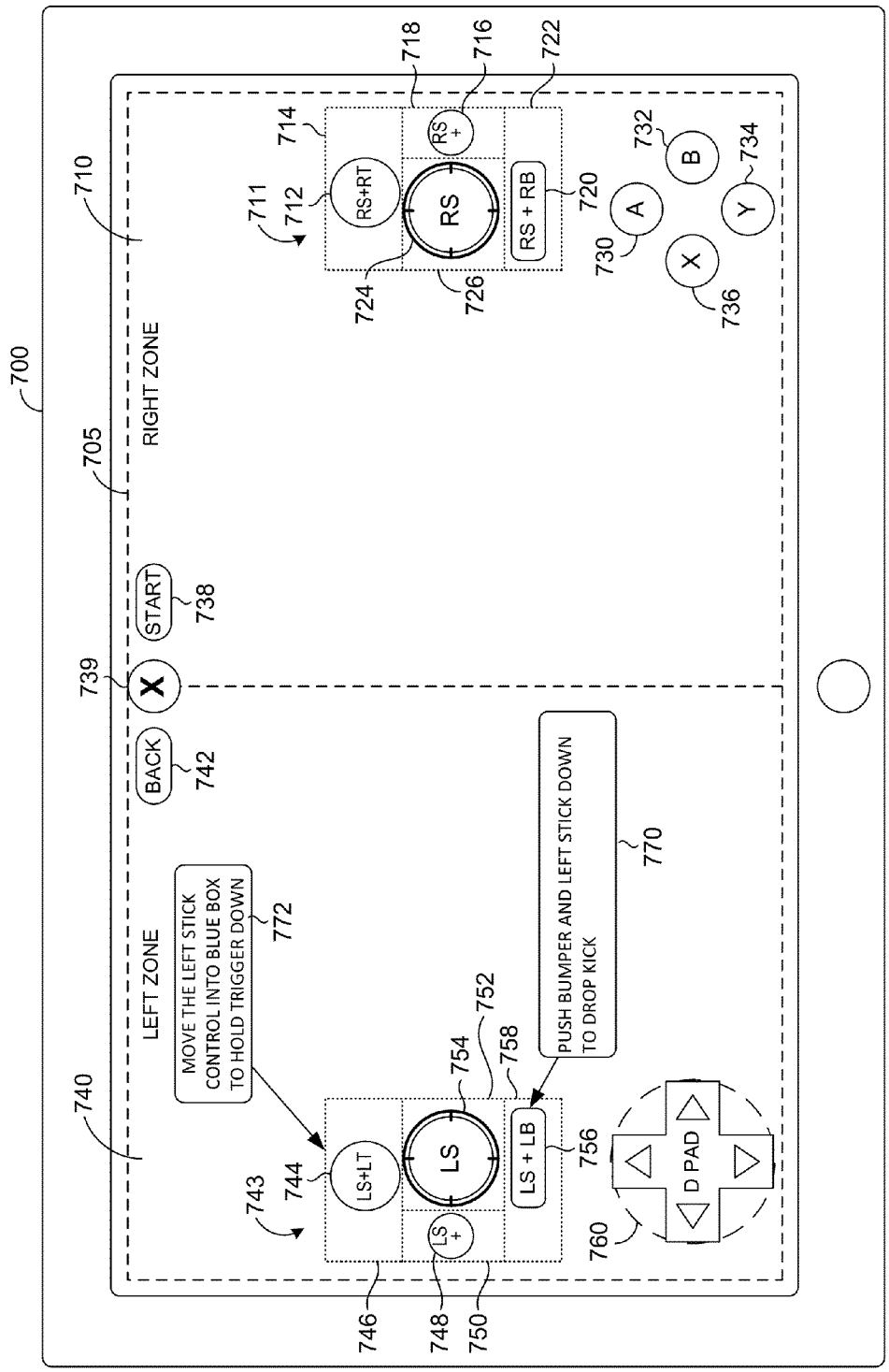
FIG. 7 is a diagram of a gamepad oriented virtual control interface with annotations, in accordance with an aspect of the present invention.

Turning now to FIG. 7, a gamepad oriented virtual control interface 705 with annotations is shown on a touch screen device 700, in accordance with an aspect of the present invention. The virtual control interface 705 includes many of the controls found on gamepad 400 described previously. The virtual control interface 705 is divided into a right zone 710 and a left zone 740. Generally, controls within the right zone 710 are optimized for interaction with the user's right hand. The controls within the left zone 740 are optimized for interaction with the user's left hand. The user's hands are not shown, but the user could be holding the device or the device could be resting on a surface. The start button 738, the guide button 739, and the back button 742 are located at the top of the virtual control interface 705.

The right zone 710 includes the right stick group 711 and face buttons 730, 732, 734, and 736. In one aspect, the face buttons are in a static. In other words, the face buttons can hold a location in the lower right corner of the virtual control interface 705 even as other controls may have a variable location. In one aspect, the arrangement of the face buttons is inverted compared to the arrangement found on the gamepad. The face buttons are round, each the same size, and arranged in a diamond pattern. The face buttons may be displayed in a color found on an associated gamepad. The color of buttons on different game pads may vary. The virtual controller interface can match the color of a gamepad selected by the user.

The right stick group 711 can start in a location where the user initially interacts with the touch screen. For example, when the user places an implement, such as his thumb, middle, or index finger on the touch screen at the right stick box 726. The virtual right stick control 724 is then displayed within the right stick box 726. The virtual right stick control 724 may be manipulated by moving a finger in different directions. Other functions within the right stick group 711 are arranged around the right stick box 726 and may be activated in a variety of ways.

The user may tap the virtual right trigger control 712 with an index finger while manipulating the virtual right stick control 724 with his thumb. Alternatively, the user may hold his finger, or other implement, on the virtual right trigger control 712 to generate a rapid fire command that is the equivalent to pulling the trigger repeatedly in rapid succession. Alternatively, the user may control the virtual right stick control 724 and "pull" the virtual right trigger control 712 located within right trigger box 714 by dragging the virtual right stick control 724 into the right trigger box 714. This allows the user to control the virtual right stick control 724 and the virtual right trigger control 712 with a single finger.

While in the right trigger box 714 the user may move her finger in a circular direction to manipulate the virtual right stick control 724.

The user may tap the virtual right bumper control 720, located within right bumper box 722. Holding a finger on the virtual right bumper control 720 can produce a rapid push command that is the equivalent to pushing the bumper repeatedly in rapid succession. Alternatively, the user may control the virtual right stick control 724 and push the virtual right bumper control 720 by dragging the virtual right stick control 724 down into the right bumper box 722. This allows the user to control the virtual right stick control 724 and the virtual right bumper control 720 with a single finger. While in the right bumper box 722 the user may move her finger in a circular direction to manipulate the virtual rights to control 724.

The virtual right stick push control 716, located in right stick box 718, causes the same command to be generated as depressing the right stick on a gamepad. The virtual right stick push control 716 may be tapped or held down by keeping a finger on the control. Alternatively, the user may control the virtual right stick control 724 and press the virtual right stick push control 716, by dragging the virtual right stick control 724 across into the right stick box 718. This allows the user to control the virtual right stick control 724 and the virtual right stick push control 716 with a single finger. While in the right stick box 718 the user may move her finger in a circular direction to manipulate the virtual right stick control 724.

The left zone 740 includes a left stick group 743. The left stick group 743 may have a floating location established the first time the user touches the left zone 740. In one aspect, the virtual left stick control 754 is centered on the first contact with the left zone 740. Prior to the initial touch, an annotation can be presented in fighting the user to establish the location of the left stick group 743 by touching the screen.

In one aspect, virtual control interface determines whether the initial touch was by a thumb or finger. This detection can be made by analyzing the shape and size of a contact zone with the touch screen interface. Games where the virtual left stick control 754 is optimally manipulated by a thumb may reject initial touch not made by a thumb and instead instruct the user to hold the touch screen device in a way where his thumb may be used to manipulate the virtual left stick control 754. A similar analysis may be performed on other virtual controls to determine whether the user is interacting with the controls in an optimal fashion. Areas for improvement may be communicated to a user to help the user efficiently use the virtual control interface 705.

The controls associated with the left stick group 743 may operate in the same way as the controls within the right stick group 711. The various controls may include different game aspects, but may be manipulated in a similar manner. The left stick group 743 includes the virtual left stick control 754 located within left stick box 752, virtual left trigger control 744 located within left trigger box 746, virtual left stick push 748 located within stick push box 750, and virtual left bumper control 756 located within left bumper box 758.

The left zone also includes a virtual direction pad 760. The virtual direction pad can be fixed to a specific location.

Aspects of the present invention, can provide annotations that help the user understand how to use the virtual control interface. Annotation 770 communicates that pushing the bumper and the left stick down will cause the user's character to perform a dropkick. The annotation could match the game title playing on a separate gaming device. Annotations can be specific to particular challenges within a game. For example, an annotation, taking the form of a hint, may be provided upon observing that the user is having difficulty overcoming a portion of a game. The annotations could be provided upon the user achieving a new capability. Annotations can also be provided as an initial tutorial for the virtual control interface 705.

Gamepad-specific annotations may also be provided. Gamepad-specific annotations let the user know how to generate inputs typically generated by a gamepad. The gamepad-specific annotations may be applicable across game titles and game genres. For example, annotation 772 instructs the user to move the left stick control into the blue box (left trigger box 746) to hold the trigger down.

Figure 8:
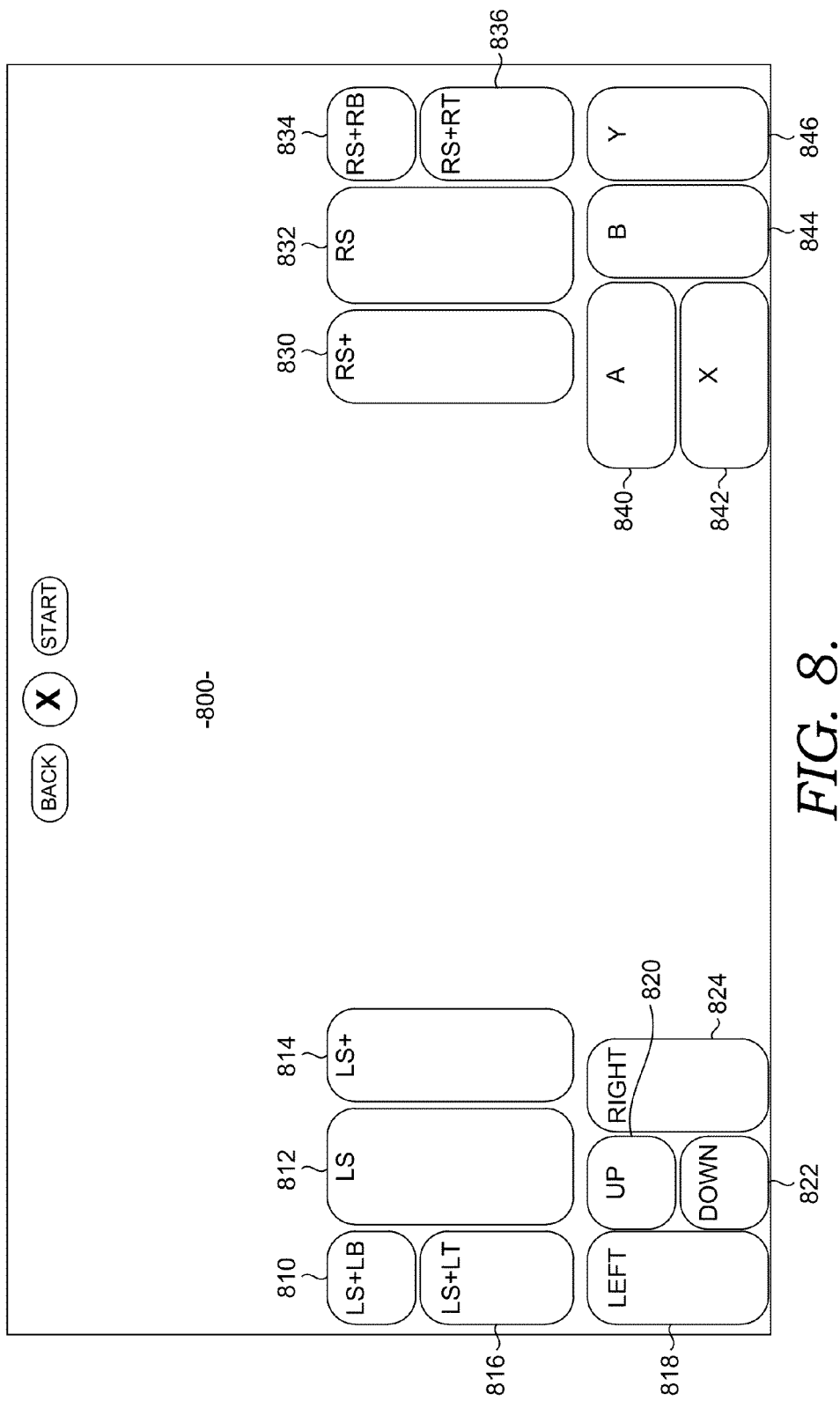
FIG. 8 is a diagram of a first-person shooter oriented virtual control interface with annotations, in accordance with an aspect of the present invention.

Turning now to FIG. 8, a first-person shooter optimized virtual control interface 800 is shown, in accordance with an aspect of the present invention. Virtual control interface 800 includes many of the controls found on a gamepad. The controls are arranged and sized in a way that is optimized for use with first-person shooter games, a popular genre. As mentioned, genre specific virtual control interfaces may be generated by game developers. Interfaces may also be generated by users that customize a general interface to their liking.

Interface 800 includes a virtual right stick push control 830, a virtual right stick control 832, a virtual right stick bumper control 834, and a virtual right stick trigger control 836. Notice that the virtual right stick trigger control 836 is larger than the virtual right stick bumper control 834 because the trigger control is used more often in a first-person shooter game than a bumper control. These four right stick controls form a right stick group that may be operated in a way similar to those described previously with reference to FIG. 7.

Virtual reference button A genre 840, virtual reference button X 842, virtual reference button B 844, and virtual reference button Y 846 are located in the lower right corner of virtual control interface 800. In one aspect, these buttons are manipulated by interacting with the touch screen at a point where these buttons are displayed. Maintaining a continuous interaction with a button may cause the button to rapidfire. In another aspect, interacting with the button and then dragging a certain direction may cause the button to rapidfire at a rate that is proportional to the distance the button is dragged. The distance dragged may stay within the button area or escape the area. The distance is measured from the first point of interaction within the button to a second point where the movement stops. A visual or audible indication may be given upon dragging a distance associated with a maximum rate of fire. For example, the perimeter of the screen may glow a color associated with the reference button when pushed and increase the illumination during the drag operation. Upon reaching the maximum rate of fire, the illuminated portion of the screen may flash to indicate the maximum has been reached.

The virtual control interface 800 also includes a left stick group and series of buttons mimicking a direction pad. The left stick group comprises virtual bumper control 810, virtual left stick control 812, virtual left stick push 814, and virtual left trigger 816. These controls may be manipulated in a manner described previously with reference to FIG. 7. Virtual direction buttons are located below the left stick group and replace a D-pad. The virtual direction buttons comprise a virtual left control 818, a virtual up control 820, a virtual down control 822, and a virtual right control 824.

Figure 9:
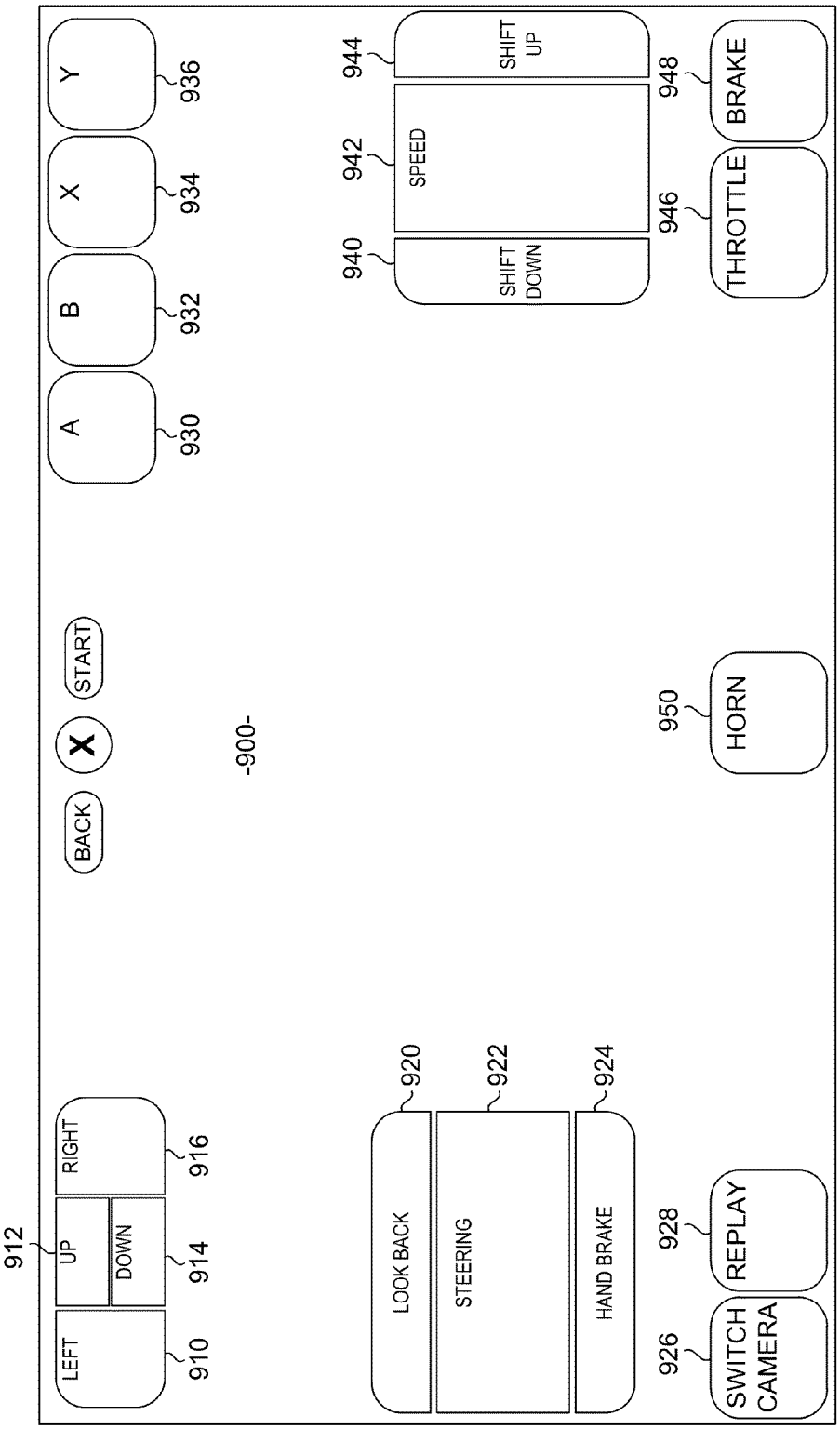
FIG. 9 is a diagram of a racing oriented virtual control interface with annotations, in accordance with an aspect of the present invention.

Turning now to FIG. 9, a driving game specific virtual control interface 900 is shown, in accordance with an aspect of the present invention. The reference buttons 930, 932, 934, and 936 are located in the upper right corner of the virtual control interface 900. These buttons can be used infrequently in some driving games and are placed in the top right corner to reserve more accessible screen space for more frequently used controls. The reference buttons correlate directly to buttons available on a gamepad.

The virtual control interface 900 may include controls that do not directly correlate to controls on a gamepad, or at least, the virtual game controls may include a label that does not match control labels on a gamepad. For example, virtual downshift control 940, virtual speed control 942, and virtual shift-up control 944 are not found on a gamepad. Instead, a trigger may be used to control speed, and other buttons, such as a bumper, may shift gears. Similarly, the virtual throttle control 946 and virtual break control 948, may correlate functionally with buttons on a gamepad but have specific labels that match the present game. The virtual control interface 900 also includes a virtual form button 950.

On the upper left side of virtual control interface 900, virtual arrows 910, 912, 914, and 916 can perform the functions associated with a direction pad on a gamepad. Game-specific controls comprise a virtual look back control 920, a virtual steering control 922, and a virtual handbrake control 924. Additional game-specific controls include a virtual camera switch control 926 and a replay control 928. Functions associated with these controls may be mapped to controls on a gamepad.

Figure 10:
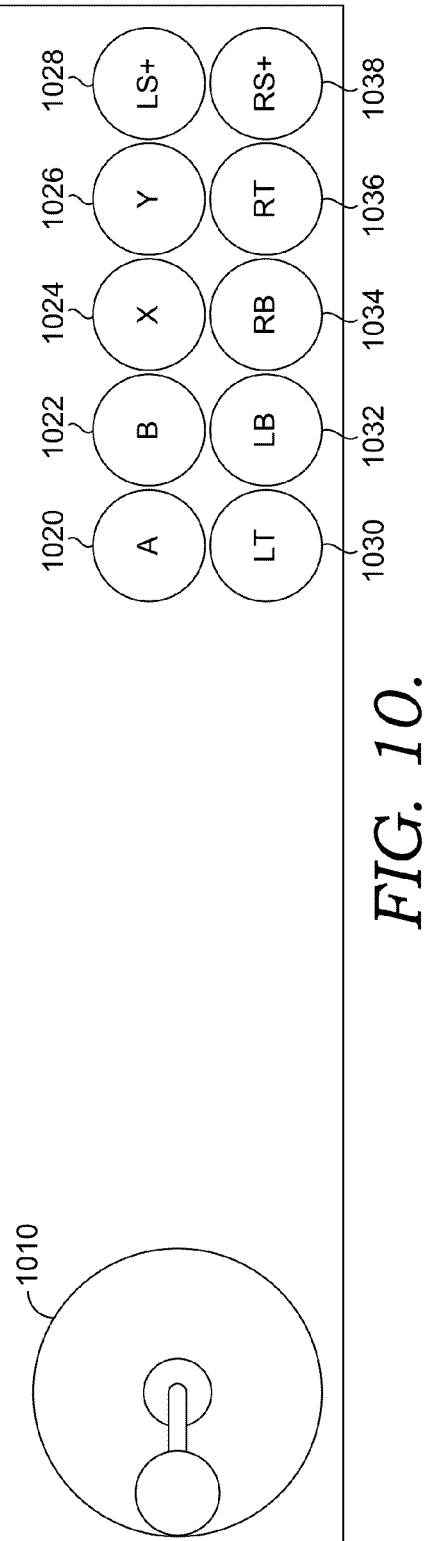
FIG. 10 is a diagram of a fighting oriented virtual control interface with annotations, in accordance with an aspect of the present invention.

Turning now to FIG. 10, a fighting specific virtual control interface 1000 is shown, in accordance with an aspect of the invention. The virtual control interface 1000 comprises a virtual stick control 1010 on the lower left portion of the touch screen. In one aspect, the virtual stick control 1010 is dynamically located upon the user initially touching the left portion of the touch screen.

The virtual buttons on virtual control interface 1000 include virtual reference buttons, virtual bumpers, virtual triggers and virtual stick pushes. The virtual reference buttons include virtual reference button 1020, virtual reference button 1022, virtual reference button 1024, and virtual reference button 1026. The virtual stick pushes include virtual left stick push 1028 and virtual right stick push 1038. The virtual triggers include virtual left trigger 1030 and virtual right trigger 1036. The virtual bumpers include virtual left bumper 1032 and virtual right bumper 1034.

In one aspect, interface 1000 is optimized for use on a flat surface, such as a table or lap. The user's left hand can manipulate the virtual stick control 1010 while the user's right hand can push the various buttons.

Figure 11:
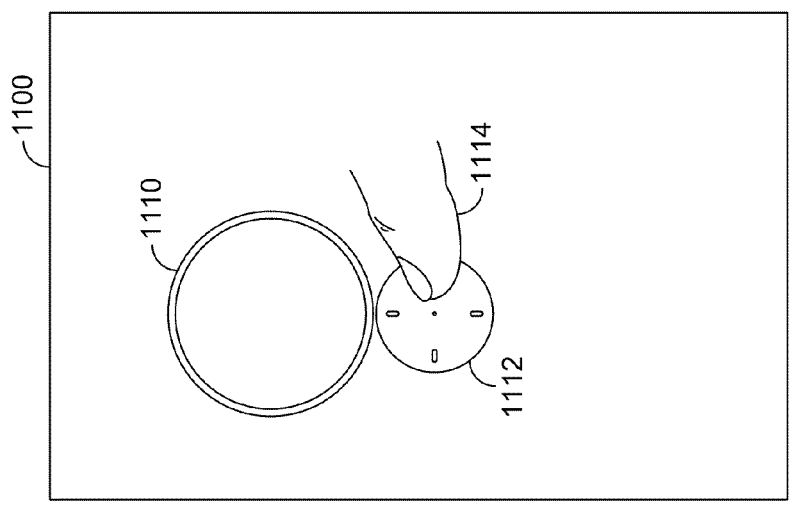
FIG. 11 is a diagram of a single thumb interface showing movement control, in accordance with an aspect of the present invention.

Turning now to FIG. 11, a single touch multifunction virtual control 1100 is illustrated, in accordance with an aspect of the present invention. The virtual control 1100 can be part of a virtual control interface. The virtual control 1100 can be manipulated by a single finger 1114 or a thumb and can perform multiple functions. The virtual control 1100 can serve as a virtual stick control that manipulates a character's direction of movement or camera orientation. Directional instructions can be provided by moving the head 1112 in a different direction within the control's base zone 1110. By moving the virtual head 1112 outside of the control base zone 1110, a second function, such as a bumper button, can be activated causing the character to run in certain games. In another aspect, a magnitude of speed is assigned according to a distance moved from the base zone 1110. This can simulate a trigger function on a gamepad, which has an order of magnitude determined based on an amount the trigger is depressed.

Figure 12:
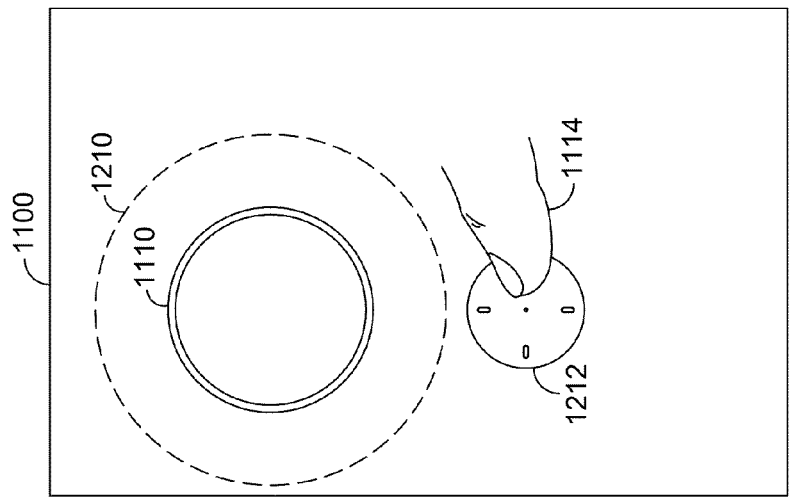
FIG. 12 is a diagram of a single thumb interface showing a button push, in accordance with an aspect of the present invention.

Turning now to FIG. 12, an additional function implemented by the single touch multifunction virtual control 1100 is illustrated, in accordance with an aspect of the present invention. As previously illustrated in FIG. 11, moving a distance away from the base may assign a magnitude or speed to the direction control. The magnitude zone 1210 is shown in FIG. 12. Dragging the head 1212 outside of the magnitude zone 1210 may activate a second function, such as firing or jumping. In one aspect, moving the head 1212 outside the magnitude zone 1210 can still affect movement of the character or camera view.

Figure 13:
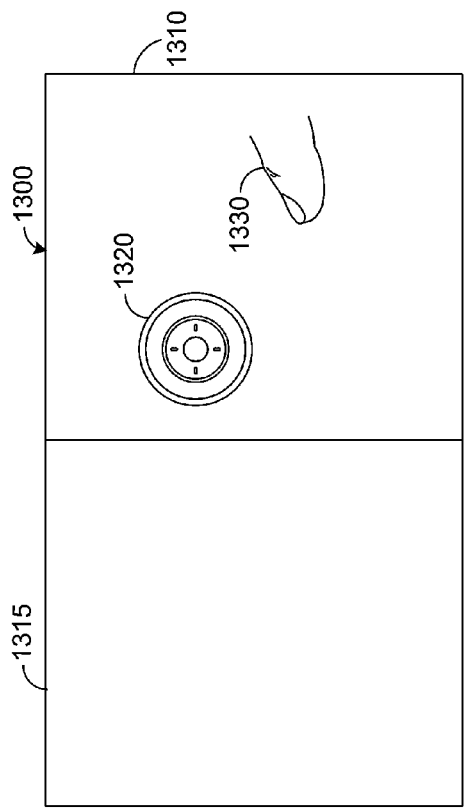

Turning now to FIG. 13, a single touch virtual control 1300 is illustrated, in accordance with an aspect of the present invention. The virtual control 1300 can be part of a virtual control interface. The single touch virtual control 1300 is designed for manipulation by a single finger 1330 or thumb. The single touch virtual control 1300 comprises a virtual stick control 1320. Maintaining contact with the virtual stick control 1320 causes a character to move or a camera view to change. Tapping the finger 1330 anywhere outside of the virtual stick control 1320 within the right zone 1310 activates an additional function, such as firing. Tapping in the left zone 1315 could activate a different function. Though not shown, the left zone 1315 could have its own multi-function single touch virtual control.

Figure 14:
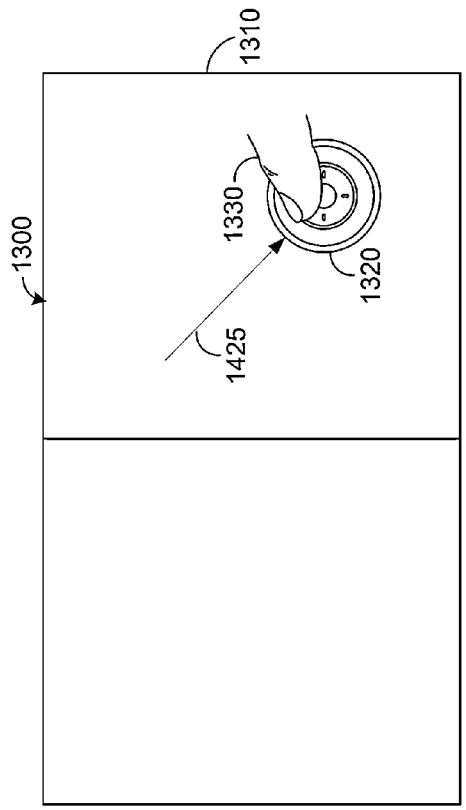
FIGS. 13-14 are diagrams showing control relocation, in accordance with an aspect of the present invention.

Turning now to FIG. 14, customization of a virtual control 1300 is illustrated. The virtual stick control 1320 can be moved within the right zone 1310 by dragging 1425 from its previous location. In one aspect, the virtual stick control 1320 is tapped first to activate a relocation mode and then dragged to his desired location. As an alternative, the virtual stick control 1320 could be located at the first location touched by the user within the right zone 1310.

Figure 15:
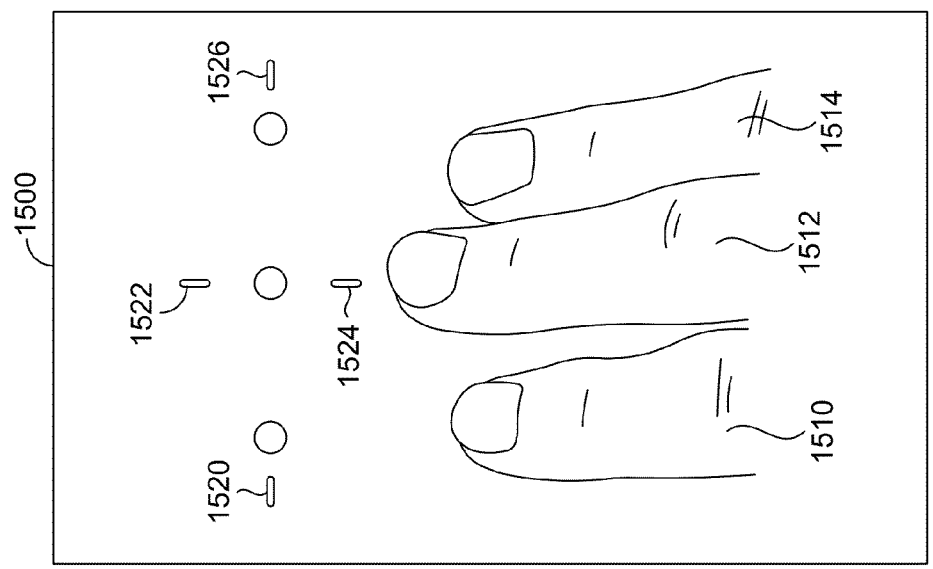
FIG. 15 is a diagram of a WASD interface, in accordance with an aspect of the present invention.

Turning now to FIG. 15, a virtual WASD control interface 1500 is shown. A WASD interface emulates a control scheme that originates on a keyboard where the "A" button is associated with a left movement, the "W" key is associated with up movement, the "D" is associated with a right movement, and the "S" is associated with a down movement. The virtual WASD interface 1500 can be combined with other controls, for example, controls manipulated by a thumb.

The middle finger 1512 can activate the up function 1522 or the down function 1524 by sliding back and forth or tapping on a function. The virtual control 1500 can be centered on a touch by the middle finger. Interactions by the index finger 1510 can activate function 1520. Interactions by the ring finger 1514 can activate function 1526.

Figure 16:
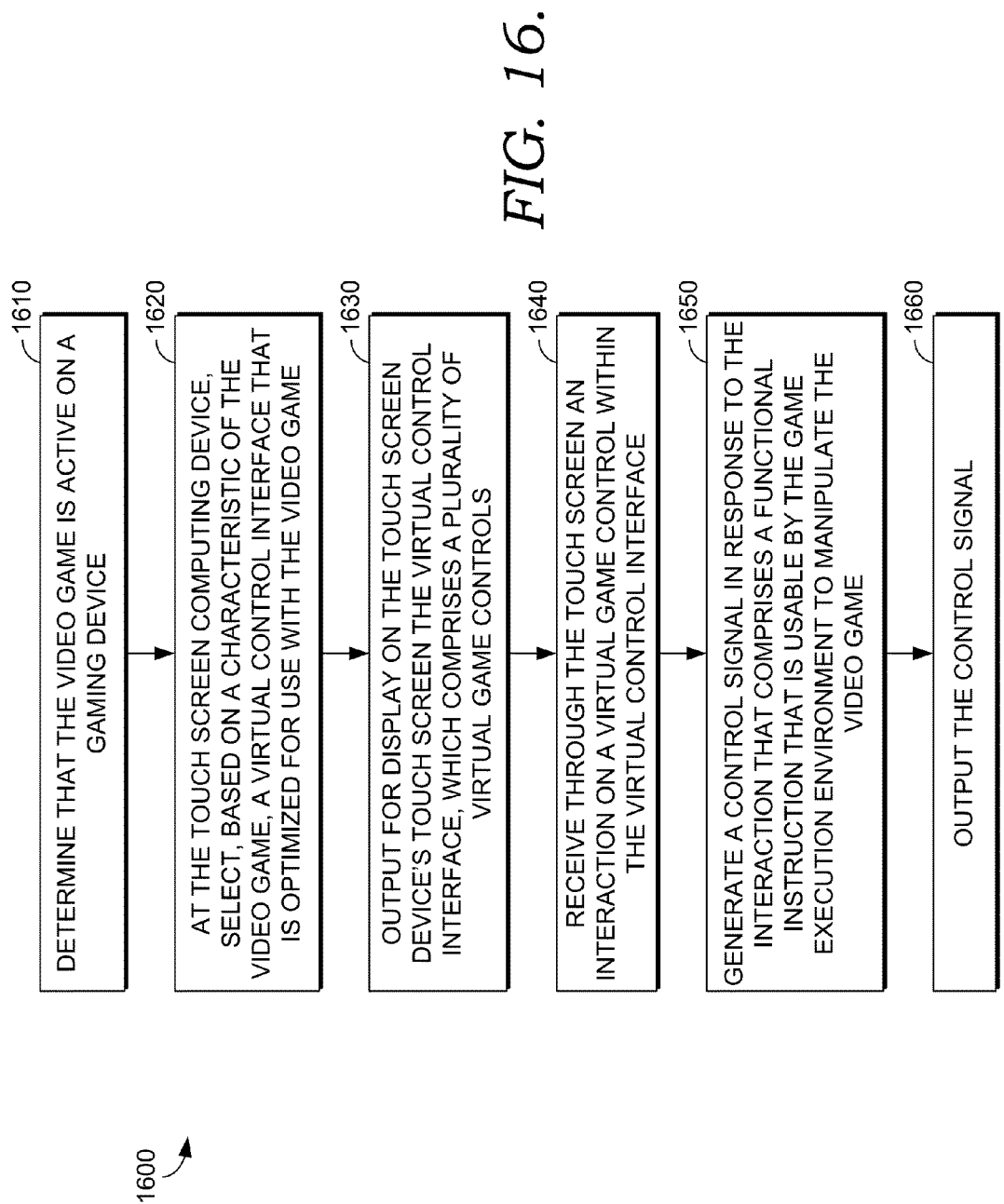
FIG. 16 is a flow chart showing a method for using a touch screen computing device to control a video game, in accordance with an aspect of the present invention.

Turning now to FIG. 16, a method 1600 for using a touch screen computing device to control a video game is provided, in accordance with an aspect of the present invention. Method 1600 may be performed by computer code being executed by one or more processors within a touch screen device, such as a smartphone or tablet.

At step 1610, optionally, a video game is determined to be active within a game execution environment on a gaming device, on the touch screen device, or in a remote gaming service. In one aspect, the determination may be made by analyzing state information describing the gaming device. A gaming device can periodically provide state information to the touch screen device. The virtual control interface application running on the touch screen device may communicate with the gaming device periodically. A remote gaming service, such as gaming service 340 may facilitate the communication of state information. The state information can include information that indicates the video game is active.

At step 1620, at the touch screen computing device, a virtual control interface that is optimized for use with the video game is selected based on a characteristic of the video game. The virtual control interface application may select a suitable virtual control interface for a library of virtual control interfaces. The library may be a remote library located at an online gaming service or on the gaming device. The library can be stored locally on the touch screen device. Either way, a suitable virtual control interface is selected based on a characteristic of the game, such as the game genre or game title. As described previously, virtual control interfaces may be customized for a particular game title or game genre, such as racing, fighting, strategy, first-person shooter, third-person shooter, and the like.

When making a selection, the virtual control interface application may also take into account user's preferences. The user's preferences may be explicitly established by a user that associates a game title or game genre with a desired virtual control interface. The user's preferences can be implicitly derived from the user's previous choices. For example, if the user played the game title with a first virtual control interface, then the first virtual control interface may be selected the next time the user plays the game title. Similarly, if the user played a racing game with the first virtual control interface, then the first virtual control interface could be selected the next time the user plays a racing game, even if it is a different racing game.

In one aspect, the user may be presented with several virtual control interface options to select from. In this aspect, the selection can be the result of direct user input. The user may be presented with ratings, comments, descriptions, and graphics that describe the various control interfaces the user can select from. In one aspect, a user's friend's preferences or usage history is noted in the selection interface. As mentioned, the various virtual control interfaces may be ranked in terms of relevance or popularity.

At step 1630, the virtual control interface is output for display on the touch screen device's touch screen. The virtual control interface comprises a plurality of virtual game controls. The virtual control interface and virtual game controls have been described previously. In one aspect, the touch screen device is not executing the video game code. Instead, the video game code is executed by a separate gaming device that receives control signals generated by the touch screen device. For example, the gaming device could be a game console or a PC.

In addition to virtual game controls, the virtual control interface may comprise one or more annotations that help a user understand how the virtual controls work. For example, an invitation could explained that the user "presses" a button by flicking their finger across the button perimeter. The annotation may take the form of words or graphics. The annotation may be game title specific and provide a hint for overcoming a particular challenge.

In one aspect, virtual game controls are dynamically located based on one or more user interactions. The virtual game controls may be dynamically moved during game play as the maximum range of the user's fingers is ascertained. Detection of a smaller range may cause the size of the virtual game controls to be reduced and for them to be clumped closer together within the range. A larger range may cause the size of the virtual game controls to be expanded and for them to be distributed a greater distance from each other throughout the larger range.

In one aspect, some of the virtual game controls are fixed on a particular location on the touch screen. Other virtual game controls may be set when the user first interacts with the virtual control interface. For example, the virtual stick control can be located upon detecting when the user's thumb interacts with the virtual control interface.

At step 1640, an interaction with a virtual game control within the virtual control interface is received through the touch screen. In one aspect, the virtual game control corresponds to a gamepad control. For example, the virtual game control could be a virtual right trigger control that corresponds to the right trigger control on a gamepad. A single virtual control could also correspond to multiple gamepad controls. For example, a single-touch multifunction virtual control, as described with reference to FIGS. 11 and 12, could correspond to both a control stick and a trigger on a gamepad. In another example, a single virtual control could correspond to activating multiple gamepad controls simultaneously or in sequence.

At step 1650, in response to the interaction, a control signal is generated that comprises a functional instruction that is usable by the game execution environment in which the game is running to manipulate the video game. The control signal can take a similar form to a control signal generated by a gamepad and can require little to no translation by a receiving game execution environment. In another aspect, the control signal takes a different form and is communicated over different communication channel from a control signal generated by a gamepad. For example, the gamepad could generate infrared signal and the touch screen device could generate a Bluetooth or Wi-Fi signal. The Bluetooth connection could be directly between the touch screen device and the gaming device. The Wi-Fi signal may be communicated over a local network or even across the Internet to a gaming service that routes the control back to the gaming device.

At step 1660, the control signal is output to the gaming execution environment. For example, the control signal could be output from a virtual interface component on the touch screen device to the game execution environment on the touch screen device or the game execution on a separate gaming device. As mentioned, the control signal could be output through infrared, Bluetooth, Wi-Fi, or some other communications protocol. The control signal may have destination information identifying the gaming device. The control signal could also identify the touch screen device.

Figure 17:
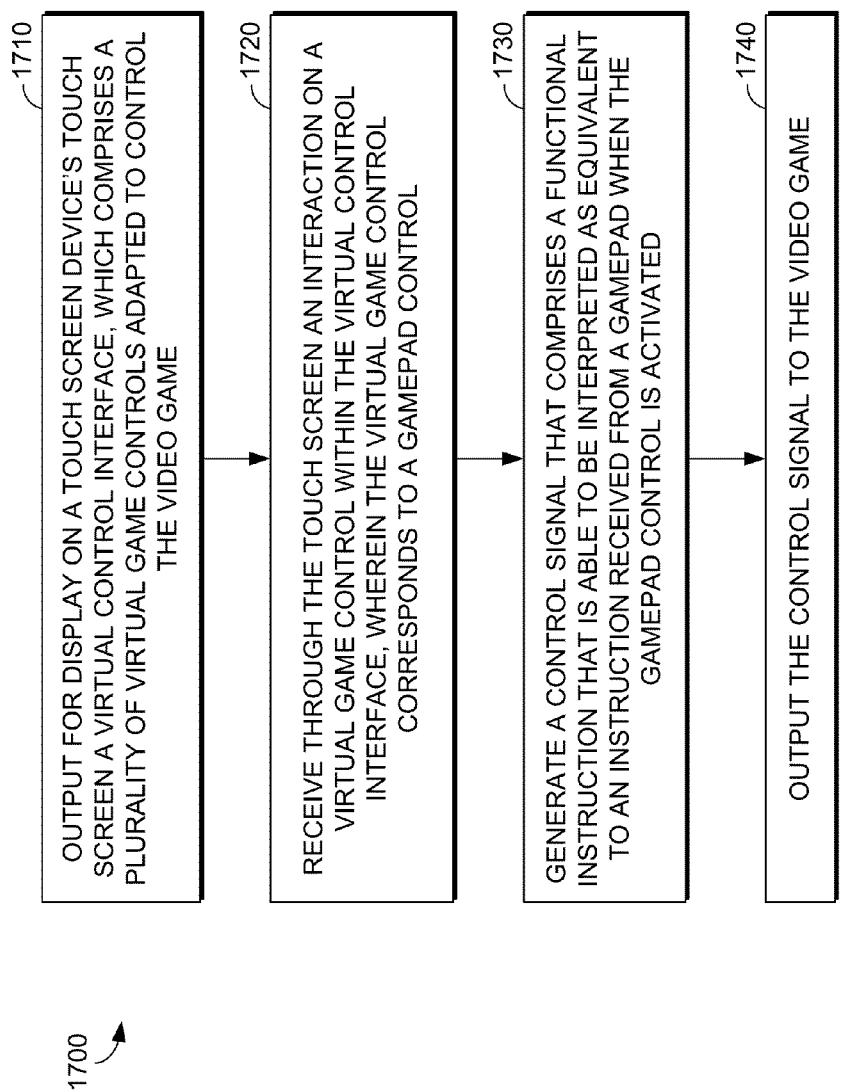
FIG. 17 is a flow chart showing a method for using a touch screen computing device to control a video game, in accordance with an aspect of the present invention.

Turning now to FIG. 17, a method 1700 for using a touch screen computing device to control a video game is provided, in accordance with an aspect of the present invention. Method 1700 may be performed by computer code being executed by one or more processors within a touch screen device, such as a smart phone or tablet.

At step 1710, a virtual control interface, which comprises a plurality of virtual game controls adapted to control the video game is output for display on a touch screen device's touch screen. Examples of virtual control interfaces and virtual game controls have been described previously. In one aspect, the touch screen device is not executing the video game code. Instead, the video game code is executed by a separate gaming device that receives control signals generated by the touch screen device. For example, a gaming device could be a game console or a PC. In another aspect, the touch screen device is both executing the video game code and providing the virtual control interface.

At step 1720, an interaction is received through the touch screen on a virtual game control within the virtual control interface. The virtual game control corresponds to a gamepad control. For example, the virtual game control could be a virtual right trigger control that corresponds to the right trigger control on a gamepad. A single virtual control could also correspond to multiple gamepad controls. For example, a single-touch multifunction virtual control, as described with reference to FIGS. 11 and 12, could correspond to both a control stick and a trigger on a gamepad. In another example, a single virtual control could correspond to activating multiple gamepad controls simultaneous or in sequence.

The interaction could be a single touch with an implement, such as a finger, thumb, or stylus. The interaction could be multitouch, which comprises contacting the touch screen in multiple places simultaneously. An interaction could also comprise a hover above the touch screen. Some touch screens are able to detect the presence of a finger or other implement that are within a threshold distance of the touch screen. In the case of a hover, the point on the virtual control interface perpendicularly below the implement can be considered interacted with.

At step 1730, in response to the interaction, a control signal is generated that comprises a functional instruction that is able to be interpreted by the video game as equivalent to an instruction received from a gamepad when the gamepad control is activated. The control signal can take a similar form to a control signal generated by a gamepad and require little to no translation by a receiving game device. In another aspect, the control signal takes a different form and is communicated over a communication channel different from a control signal generated by a gamepad. For example, the gamepad could generate infrared signal and the touch screen device could generate a Bluetooth or Wi-Fi signal. The Bluetooth connection could be directly between the touch screen device and the gaming device. The Wi-Fi signal may be communicated over a local network or even across the Internet to a gaming service that routes the control back to the gaming device.

At step 1740, the control signal is output to the video game. As mentioned, the control signal could be output through infrared, Bluetooth, Wi-Fi, or some other communications protocol. The control signal may have destination information identifying the gaming device. The control signal could also identify the touch screen device.

Figure 18:
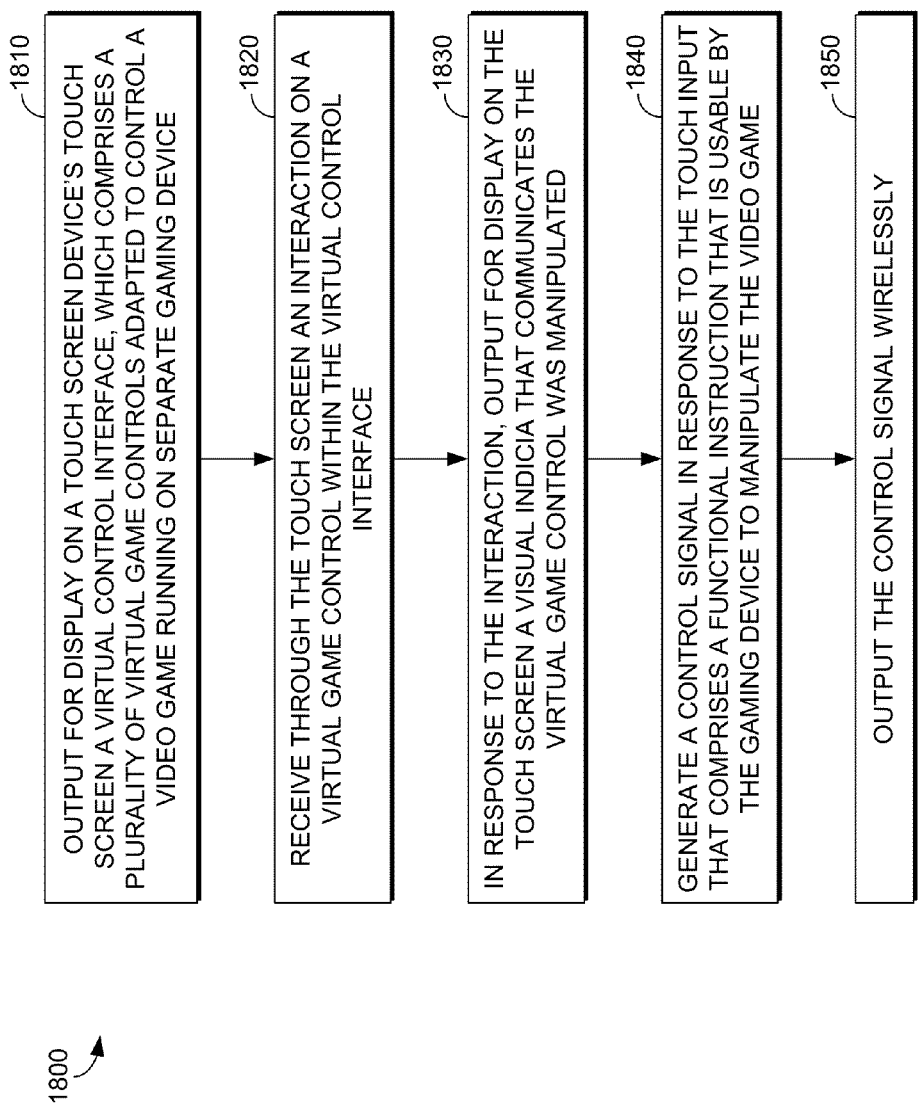
FIG. 18 is a flow chart showing a method of providing a virtual control interface, in accordance with an aspect of the present invention.

Turning now to FIG. 18, a method 1800 for using a touch screen computing device to control a video game is provided, in accordance with an aspect of the present invention. Method 1800 may be performed by computer code being executed by one or more processors within a touch screen device, such as a smartphone or tablet.

At step 1810, a virtual control interface, which comprises a plurality of virtual game controls adapted to control a video game running on a separate gaming device, is output for display on a touch screen device's touch screen. A virtual control interface and a virtual game control have been described previously. The virtual control interface controls a video game running on a separate gaming device, such as a game console.

At step 1820, an interaction on a virtual game control within the virtual control interface is received through the touch screen. Examples of interactions have been described previously and can include touching the screen or hovering near the screen.

At step 1830, in response to the interaction, a visual indicia that communicates the virtual game control was manipulated is output for display on the touch screen. The visual indicia attempt to overcome the lack of tactile feedback provided by a gamepad. The visual indicia communicate that the virtual game control has been successfully activated. For example, upon pushing a green reference button, a green glow may briefly appear around the perimeter of the screen or in some other portion of the screen.

At step 1840, in response to the touch input, a control signal is generated that comprises a functional instruction that is usable by the gaming device to manipulate the video game. The control signal can take a similar form to a control signal generated by a gamepad and require little to no translation by a receiving game device. In another aspect, the control signal that takes a different form is communicated over a different communication channel from a control signal generated by a gamepad. For example, the gamepad could generate infrared signal and the touch screen device could generate a Bluetooth or Wi-Fi signal. The Bluetooth connection could be directly between the touch screen device and the gaming device. The Wi-Fi signal may be communicated over the Wi-Fi signal may be communicated over a local network or even across the Internet to a gaming service that routes the control back to the gaming device.

At step 1850, the control signal is wirelessly output. As mentioned, the control signal could be output through infrared, Bluetooth, Wi-Fi, or some other communications protocol. The control signal may have destination information identifying the gaming device. The control signal could also identify the touch screen device.

In one aspect, the touch screen device may generate additional game input apart from interactions with the touch screen. For example, buttons on the touch screen device may be associated with a game function or gamepad control. In one aspect, buttons located on the back, or side opposite of the touch screen, can be used to generate functional control signals. In one aspect, a touch surface is provided on the back of the touch screen device for the purpose of generating game control signals.

For example, the touch screen device could be a keyboard connected to the touch screen device and folded behind it. Sections of the keyboard could be associated with different commands; for example, a portion on the right side of the keyboard could be associated with a virtual right trigger control or a virtual right bumper control. In one aspect, the virtual control interface on the touch screen provides a thumb optimized virtual game control on the right side and assigns a zone on the rear touch surface for interaction by the index finger and middle finger.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method for using a touch screen computing device to control a video game, the method comprising:
    determining, based on a characteristic of the video game, a video game genre for the video game;
    selecting, from a plurality of available genre specific virtual control interfaces that each include different combinations of virtual game controls, a virtual control interface that is optimized for use with the video game genre;
    outputting for display on a touch screen device's touch screen a virtual control interface, which comprises a plurality of virtual game controls adapted to control the video game;
    receiving through the touch screen an interaction on a virtual game control within the virtual control interface, wherein the virtual game control corresponds to a gamepad control;
    generating a control signal that comprises a functional instruction that is able to be interpreted by the video game as equivalent to an instruction received from a gamepad when the gamepad control is activated; and
    outputting the control signal to the video game.

2. The method of claim 1, wherein the genre is first person or third-person shooter.

3. The method of claim 2, wherein the interaction is an implement interacting with the touch screen at a first point within the virtual game control and then being dragged a distance across the touch screen to a second point outside of the virtual game control, wherein the distance establishes a rate of fire.

4. The method of claim 3, wherein the interaction is an implement touching a point anywhere within a virtual steering control and then moving a distance to a second point on the touch screen, the distance correlated to a degree of turn.

5. The method of claim 1, wherein the genre is car racing.

6. The method of claim 1, wherein the interaction is an implement moving a distance across the touch screen from a first point within the virtual game control to a second point outside of the virtual game control, and wherein the gamepad control is repeatedly pushing a button.

7. The method of claim 1, wherein the method further comprises:
  in response to the interaction, outputting for display on the touch screen a visual indicia that communicates the virtual game control was manipulated, wherein the visual indicia comprises changing a perimeter of the touch screen to match a color of the virtual game control.

8. The method of claim 1, wherein the method further comprises:
  receiving a touch through a touch interface located on a side opposite to the touch screen;
  generating a different control signal that comprises a different function instruction that is usable by the gaming device to manipulate the video game; and
  outputting the different control signal wirelessly.

9. The method of claim 8, wherein the touch interface is a keyboard.

10. The method of claim 1, wherein the method further comprises receiving an initial interaction at a location on the virtual control interface and dynamically locating the virtual game control at the location.

11. A touchscreen computing device comprising:
  a processor;
  a touchscreen display; and
  computer storage memory having computer-executable instructions stored thereon which, when executed by the processor, implement a method for using the touch screen computing device to control a video game, the method comprising:
  (1) determining, based on a characteristic of the video game, a video game genre for the video game;
  (2) selecting, from a plurality of available genre specific virtual control interfaces that each include different combinations of virtual game controls, a virtual control interface that is optimized for use with the video game genre;
  (3) outputting for display on a touch screen device's touch screen a virtual control interface, which comprises a plurality of virtual game controls adapted to control the video game;
  (4) receiving through the touch screen an interaction on a virtual game control within the virtual control interface, wherein the virtual game control corresponds to a gamepad control;
  (5) generating a control signal that comprises a functional instruction that is able to be interpreted by the video game as equivalent to an instruction received from a gamepad when the gamepad control is activated; and
  (6) outputting the control signal to the video game.

12. The touchscreen computing device of claim 11, wherein the genre is first person or third-person shooter interaction is a swipe gesture starting within the virtual game control, and wherein the gamepad control is a button.

13. The touchscreen computing device of claim 12, wherein the interaction is an implement interacting with the touch screen at a first point within the virtual game control and then being dragged a distance across the touch screen to a second point outside of the virtual game control, wherein the distance establishes a rate of fire.

14. The touchscreen computing device of claim 11, wherein the genre is car racing.

15. The touchscreen computing device of claim 14, wherein the interaction is an implement touching a point anywhere within a virtual steering control and then moving a distance to a second point on the touch screen, the distance correlated to a degree of turn.

16. The touchscreen computing device of claim 11, wherein the interaction is an implement moving a distance across the touch screen from a first point within the virtual game control to a second point outside of the virtual game control, and wherein the gamepad control is repeatedly pushing a button.

17. The touchscreen computing device of claim 11, wherein the method further comprises:
  in response to the interaction, outputting for display on the touch screen a visual indicia that communicates the virtual game control was manipulated, wherein the visual indicia comprises changing a perimeter of the touch screen to match a color of the virtual game control,
  an orientation of buttons within the virtual control interface is different from an orientation of corresponding buttons on the gamepad.

18. The touchscreen computing device of claim 11, wherein the method further comprises:
  receiving a touch through a touch interface located on a side opposite to the touch screen;
  generating a different control signal that comprises a different function instruction that is usable by the gaming device to manipulate the video game; and
  outputting the different control signal wirelessly.

19. The touchscreen computing device of claim 18, wherein the touch interface is a keyboard.

20. The touchscreen computing device of claim 11, wherein the virtual game control is displayed with an annotation describing how to interact with the virtual game control.

21. The touchscreen computing device of claim 11, wherein the method further comprises receiving an initial interaction at a location on the virtual control interface and dynamically locating the virtual game control at the location.

* * * * *